United States Patent
Angelhag

(10) Patent No.: US 7,558,595 B2
(45) Date of Patent: Jul. 7, 2009

(54) MOBILE TERMINALS, METHODS, AND PROGRAM PRODUCTS THAT GENERATE COMMUNICATION INFORMATION BASED ON CHARACTERS RECOGNIZED IN IMAGE DATA

(75) Inventor: Anders Angelhag, Lund (SE)

(73) Assignee: Sony Ericsson Mobile Communications AB (SE)

( * ) Notice: Subject to any disclaimer, the term of this patent is extended or adjusted under 35 U.S.C. 154(b) by 945 days.

(21) Appl. No.: 10/877,061

(22) Filed: Jun. 25, 2004

(65) Prior Publication Data

US 2005/0286493 A1     Dec. 29, 2005

(51) Int. Cl.
*H04M 1/00*     (2006.01)

(52) U.S. Cl. ............. 455/550.1; 455/552.1; 455/556.1; 348/376

(58) Field of Classification Search ................. 455/550, 455/564; 705/14; 379/93.12, 142, 113; 235/384; 382/173

See application file for complete search history.

(56) References Cited

U.S. PATENT DOCUMENTS

| 5,901,209 A * | 5/1999 | Tannenbaum et al. .. 379/142.09 |
| 6,522,889 B1 * | 2/2003 | Aarnio ..................... 455/456.5 |
| 6,594,503 B1 * | 7/2003 | Herzig et al. ............. 455/550.1 |
| 2002/0055957 A1 | 5/2002 | Ohsawa ....................... 707/513 |
| 2003/0016386 A1 * | 1/2003 | Wiebe et al. ................ 358/1.15 |
| 2003/0030638 A1 | 2/2003 | Astrom et al. .............. 345/420 |
| 2003/0220835 A1 * | 11/2003 | Barnes, Jr. .................... 705/14 |
| 2004/0233930 A1 * | 11/2004 | Colby, Jr. .................... 370/464 |
| 2005/0050165 A1 * | 3/2005 | Hamynen ................... 709/218 |
| 2005/0205671 A1 * | 9/2005 | Gelsomini et al. .......... 235/384 |

FOREIGN PATENT DOCUMENTS

| CN | 1413026 A | 4/2003 |
| EP | 1 411 460 | 4/2004 |

OTHER PUBLICATIONS

Notification of Transmittal of the International Search Report and The Written Opinion of the International Searching Authority, or the Declaration; Application No. PCT/EP2005/004573; Jul. 26, 2005.
English language translation of Second Office Action, CN Application No. 200580028385.1, Dec. 19, 2008.

* cited by examiner

*Primary Examiner*—Simon Sing
*Assistant Examiner*—Simon King
(74) *Attorney, Agent, or Firm*—Myers Bigel Sibley & Sajovec, P.A.

(57) ABSTRACT

Mobile terminals, methods, and program products generate information for communication from a mobile terminal. The mobile terminal can include a camera device and a controller. The camera device is configured to capture image data based on incident light. The controller is configured to recognize characters in the image data, and to generate the information that is to be communicated from the mobile terminal based on the recognized characters. The controller may determine that the recognized characters are indicative of an Internet address, a message address, a telephone number, a street address, and/or contact information.

9 Claims, 2 Drawing Sheets

MOBILE TERMINALS, METHODS, AND PROGRAM PRODUCTS THAT GENERATE COMMUNICATION INFORMATION BASED ON CHARACTERS RECOGNIZED IN IMAGE DATA

FIELD OF THE INVENTION

The present invention generally relates to the field of communications, and more particularly to apparatus, methods, and computer program products for generating communication information.

BACKGROUND OF THE INVENTION

The Internet is a decentralized network of computers that can communicate with one another via various Internet protocols (IPs). There has been tremendous growth in use and traffic over the Internet since the development of the worldwide Web (WWW), which is one of several service facilities provided on the Internet. The WWW is a client-server based facility that includes a number of servers (computers connected to the Internet) on which Web pages or files reside, as well as clients (Internet browsers), which interface the users with the Web pages. Specifically, Internet browsers and software applications send a request over the WWW to a server requesting a Web page identified by an address (Uniform Resource Locator) which notes both the server where the Web page resides and the file or files on that server which make up the Web page. The server then sends a copy of the requested file(s) to the Internet browser, which in turn displays the Web page to the user.

Wireless mobile terminals generally have more constrained memory, bandwidth, and man-machine interface (MMI) (i.e., display, keypad) constraints than personal computers. A wireless application protocol (WAP) has been developed that can allow wireless mobile terminals to access the Internet within their constraints.

Internet addresses are increasingly appearing in magazines, newspapers, and within other printed documents. A user may enter the listed address into a browser to access a server that is associated with, for example, an advertiser. For mobile terminals, entering such addresses can involve typing a potentially long string of characters into a keypad that has an alphanumeric multifunctional capability. Although some mobile terminal MMIs provide predictive text entry processes, such predictive processes may not work well when typing Internet addresses, which can include acronyms and/or combinations of letters, numbers, and other characters.

SUMMARY OF THE INVENTION

Mobile terminals, methods, and program products that generate communication information by recognizing characters in image are provided according to various embodiments of the present invention.

In some embodiments of the present invention, a mobile terminal includes a camera device that is configured to capture image data based on incident light, and a controller that is configured to recognize characters in the image data, and to generate information that is to be communicated from the mobile terminal based on the recognized characters.

In some further embodiments of the present invention, the controller may be configured to recognize the characters by carrying out an optical character recognition process on the image data. The controller may be configured to determine that one or more of the recognized characters is indicative of an Internet address. When a recognized character(s) is indicative of an Internet address, the controller may generate an Internet address based on the recognized characters, and may initiate a connection with an Internet site through a wireless transceiver based on the generated Internet address. The controller may activate an Internet browser based on the determination that one or more of the recognized characters is indicative of an Internet address.

The controller may be configured to determine that one or more of the recognized characters is indicative of a message address. When a recognized character(s) is indicative of a message address, the controller may generate an message address based on the recognized characters, and may generate a message based on the generated message address. The generated message may include an email message, a Short Message Service message, an Enhanced Message Service message, and/or a Multimedia Message Service message.

The controller may be configured to determine that a plurality of the recognized characters are indicative of a telephone number in the image data, to generate a telephone number based on the recognized characters, and to generate a telephone call based on the generated telephone number.

The mobile terminal may further include a contact information database. The controller may determine that one or more of the recognized characters is indicative of contact information in the image data, generate contact information based on the recognized characters, and add the generated contact information to the contact information database.

Some other embodiments of the present invention provide a method of generating information for communication from a mobile terminal. Characters in image data are recognized, and information that is to be communicated from the mobile terminal is generated based on the recognized characters.

In some further embodiments of the present invention, the image data may be OCR searched to recognize characters. Character recognition may include determining that one or more of the recognized characters is indicative of an Internet address. An Internet address may be generated based on the recognized characters. A connection may be initiated with an Internet site based on the generated Internet address. An Internet browser may be activated based on the determination that one or more of the recognized characters is indicative of an Internet address.

Character recognition may include determining that one or more of the recognized characters is indicative of an message address, and a message address may be generated based on the recognized characters. A message that is to be communicated from the mobile terminal may be generated based on the generated message address. The generated message may be an email message, a Short Message Service message, an Enhanced Message Service message, and/or a Multimedia Message Service message.

Character recognition may include determining that a plurality of the recognized characters are indicative of a telephone number in the image data. A telephone number may be generated based on the recognized characters, and the generated telephone number may be called.

Character recognition may include determining that one or more of the recognized characters is indicative of contact information (e.g., Internet address, message address, telephone number) in the image data, contact information may be generated based on the recognized characters, and the generated contact information may be added to the contact information database.

Some other embodiments of the present invention provide program product for generating information for communication from a mobile terminal. The program product includes program code that is configured to recognize characters in image data, and program code that is configured to generate information that is to be communicated from the mobile terminal based on the recognized characters.

In some further embodiments of the present invention, the program product includes program code that is configured to determine that one or more of the recognized characters is indicative of an Internet address, a message address, and/or a telephone number.

DETAILED DESCRIPTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

Embodiments according to the present invention are described with reference to block diagrams and/or operational illustrations of methods, mobile terminals, and computer program products. It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "mobile terminal" includes, but is not limited to, a terminal that is configured to receive/transmit communication signals via a wireline connection, such as via a public-switched telephone network (PSTN) or another data connection/network, and/or via a wireless interface with, for example, a cellular network, a wireless local area network (WLAN), and/or another communication terminal. Examples of mobile terminals include, but are not limited to, a personal communication terminal, such as a smart-phone, personal data assistant (PDA), and/or computer that may combine a cellular communication device, Bluetooth communication device, and/or a local/wide area network communication device with data processing capability.

Figure 1:
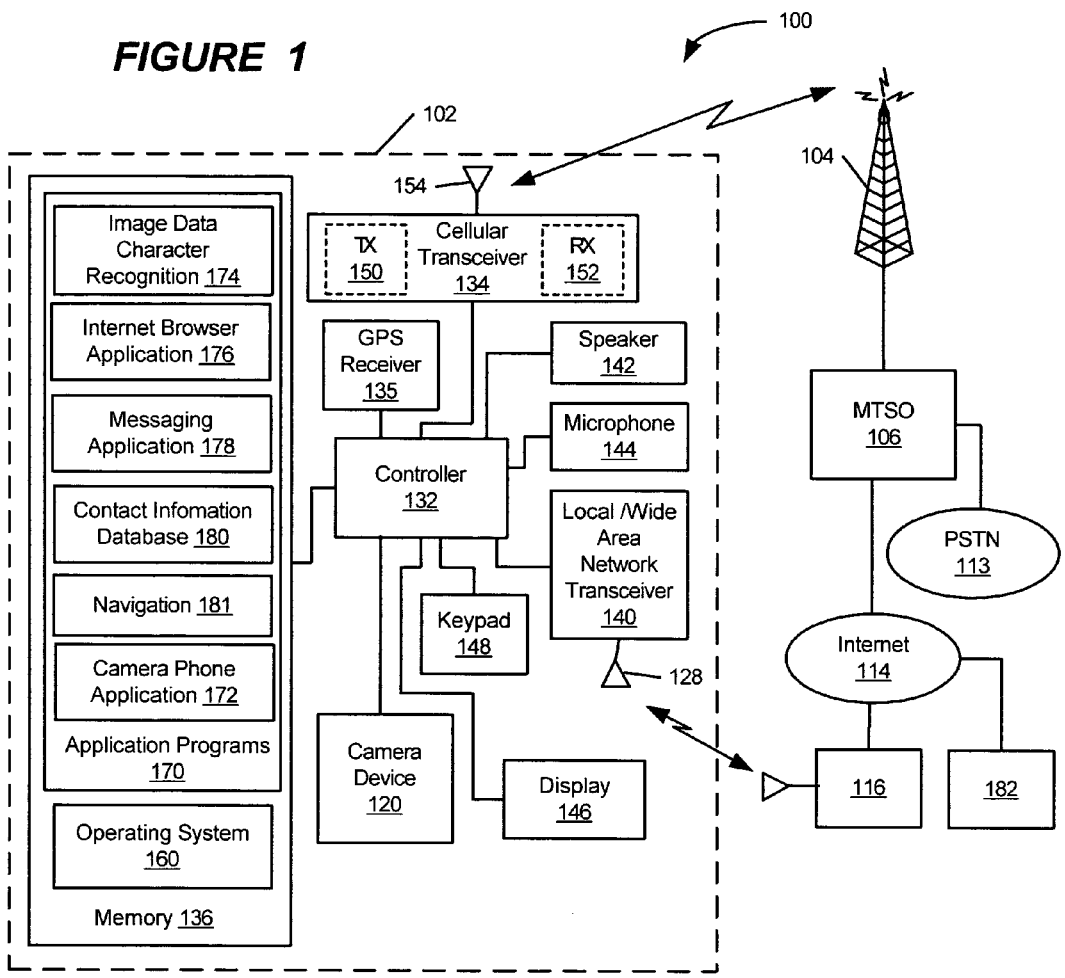
FIG. 1 is a schematic block diagram illustrating a mobile terminal according to some embodiments of the present invention.

FIG. 1 is a schematic block diagram of a wireless communication system 100 that includes a wireless terminal 102 that communicates wireless signals with a cellular base station 104 and/or a wireless local/wide area network 116. The cellular base station 104 is connected to a Mobile Telephone Switching Office (MTSO) 106 wireless network, which, in turn, is connected to a PSTN 113, and the Internet 114. The mobile terminal 102 may communicate with the wireless local/wide area network 116 using a communication protocol that may include, but is not limited to, 802.11a, 802.11b, 802.11e, 802.11g, 802.11i, Bluetooth, and/or another wireless local area network protocols. The wireless local/wide area network 116 is connected to the Internet 114.

In some embodiments of the present invention, the mobile terminal 102 includes a camera device 120, a controller 132, a cellular transceiver 134, a GPS receiver 135, a memory 136, a local/wide area network transceiver 140, and may also include a speaker 142, a microphone 144, a display 146 and a keypad 148. The local/wide area network transceiver 140 can communicate with the wireless local/wide area network 116. The cellular transceiver 134 can communicate with the cellular base station 104.

The cellular transceiver 134 typically includes both a transmitter (TX) 150 and a transmitter (RX) 152 to allow two way communications, but the present invention is not limited to such devices and, as used herein, a "transceiver" may include only one of the transmitter 150 or receiver 152. The mobile terminal 102 may thereby communicate with the base station 104 using radio frequency signals, which may be communicated through an antenna 154. For example, the mobile terminal 102 may be configured to communicate via the cellular transceiver 134 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). Communication protocols as used herein may specify the information communicated, the timing, the frequency, the modulation, and/or the operations for setting-up and/or maintaining a communication connection. The antennas 128 and 154 may be a single antenna.

The GPS receiver 135 is configured to receive signals from GPS satellites and to determine a location of the mobile terminal 102 based thereon.

The camera device 120 can capture image data based on incident light. The captured image data may include still picture data and/or video data, and may be temporarily and/or permanently stored within the memory 136 and/or the camera device 120. The controller 132 is configured to recognize characters in captured image data, and can generate information that is to be communicated from the mobile terminal based 102 on the recognized characters, as will be described with regard to exemplary software in the memory 136.

The memory 136 is representative of the overall hierarchy of memory devices containing the software and data used to implement the functionality of the mobile terminal 102. As shown in FIG. 1, the memory 136 may include several categories of software and data used in the mobile terminal 102: an operating system 160 and application programs 170. As will be appreciated by those of skill in the art, the operating system 160 may be any operating system suitable for operating a mobile terminal, such a wireless mobile terminal, and may include, but not be limited to, Symbian, PalmOS, EPOC, Windows CE, Java, Windows95, Windows98, Windows2000 or WindowsXP, Unix or Linux.

The application programs 170 are illustrative of the programs that implement the various features of the mobile terminal 170 and includes at least one application which supports operations according to embodiments of the present invention. The application programs 170 may include a camera phone application 172, an image data character recognition application 174, an Internet browser 176, a messaging application 178, a contact information database 180, and a navigation application 181.

The controller 132, through the camera phone application 172, can be configured to store image data, to send image data through the cellular transceiver 134 and/or the local/wide area network transceiver 140, and/or to display the image data on the display 146. For example, captured image data may be associated with a message, such as an Email message, a Short Message Service message, an Enhanced Message Service message, and/or a Multimedia Message Service message and communicated through the controller 132 via the messaging application 178 from the mobile terminal 102.

The controller 132, through the image data character recognition application 174, is configured to recognize characters in image data, and to generate information that is to be communicated from the mobile terminal 102 based on the recognized characters. Such character recognition may be carried out by an optical character recognition (OCR) process, and may include searching image data for a predetermined character and/or string of characters that are indicative of an Internet address, a message address, and/or a telephone number. Such searching may be carried out by pattern matching, whereby characters that may be embedded within, and which may be partially obscured by, a photograph or graphical illustration may be matched to one or more known character patterns.

The controller 132 may search image data for the characters "WWW", "WAP", "HTTP", "://" and/or another predetermined character or string of characters that can be indicative of an Internet address. Responsive to an indication of an Internet address, the controller 132 may attempt to generate an Internet address based on recognized characters in the image data, such as from characters that are adjacent to the predetermined character(s). The controller 132 may then active the Internet browser 176, and/or insert the generated Internet address into an already active Internet browser 176, and attempt to establish a connection with an Internet server, such as the server 182, based on the generated Internet address. The controller 132 may prompt a user with the generated Internet address and selectively establish the connection based on the user's response. The Internet browser may be, for example, based on a Wireless Application Protocol (WAP) and/or based on another browser such as Microsoft Internet Explorer that supports HTML, XML, TCP/IP, and/or WML.

The controller 132 may search image data for the character "@", a predetermined dot-extension, such as ".COM", and/or another predetermined character or string of characters that can be indicative of a message address. Responsive to an indication of a message address, the controller 132 may attempt to generate a message address based on recognized characters in the image data, such as from characters that are adjacent to the predetermined character(s). The controller 132 may then activate the messaging application 178 and generate a message based on the generated message address. The generated message may be, for example, an Email message, a Short Message Service message, an Enhanced Message Service message, and/or a Multimedia Message Service message. For example, the generated message address may be inserted into the address field of a new and/or existing message. The controller 132 may prompt a user with the generated message address and selectively generate a message based on the user's response.

The controller 132 may search image data for a string of numbers that may be formatted so as to be indicative of a telephone number. Responsive to an indication of a telephone number, the controller 132 may attempt to generate a telephone number based on recognized characters in the image data, and may attempt to dial the telephone number. The controller 132 may prompt a user with the generated telephone number and selectively dial the telephone number based on the user's response.

The controller 132 may prompt a user with a generated Internet address, message address, and/or telephone number and, based on the user's response, may add it to the contact information database 180. The contact information database 180 may include, but not be limited to list of prior generated Internet addresses, message addresses, and/or telephone numbers, and/or may include a list of such communication information that has been selected by a user for inclusion in the list.

Accordingly, when a user observes an Internet address, a message address, and/or a telephone number within a printed document, such as a newspaper or magazine, the user may take a picture of a portion of the printed document that includes the desired information. The mobile terminal 102 may then processes the picture, via its captured image data, to recognize the desired information and to generate information that is to be communicated from the mobile terminal 102. The generated information can include an Internet address for a browser, a message address for a message, and/or a telephone number to be dialed.

In some illustrative embodiments of the present invention, a user may capture image data with the camera phone application 172, and may then activate the Internet browser 176. Activation of the Internet browser 176 may activate the image data character recognition application 174 to search the image data for an indication of an Internet address, to generate the Internet address, and to cause the mobile terminal 102 to attempt to establish an Internet connection based thereon. Alternatively, a user may activate the Internet browser 176, which may selectively cause image data to be captured and searched for an indication of an Internet address, and to cause the mobile terminal 102 to attempt to establish an Internet connection based thereon. Alternatively, captured image data may be automatically searched for an indication of an Internet address, and to prompt a user regarding connecting to an identified Internet address. In these illustrative embodiments, the image data may be additionally or alternative searched for a message address and/or a telephone number.

In yet some other illustrative embodiments of the present invention, an image may be at least temporarily captured, such as in a viewfinder mode, and the image may then be captured based on user selecting a key that initiates the Internet browser, a key that initiates messaging, and/or a key that initiates dialing of a telephone number. Based on such key selection, the captured image may be processed to recognize and then generate the corresponding information (i.e., Internet address, messaging address, and/or telephone number) for use by the corresponding application.

The navigation application 181 may generate a street address from the image data. The navigation application 181 may automatically recognize that the image data contains a street address and/or a user may input an indication of what type of data is contained in the image data (i.e., a street address, Internet address, messaging address, and/or telephone number). Such a user provided indication may then be used by the corresponding one of the application programs 170 to generate the identified type of data. The navigation application 181 may illustrate on the display 146 a graphical representation of the generated street address, and it may further generate a route along roads based on the generated street address.

The navigation application 181 may alternatively, or additionally, provide navigation information based on the location of the mobile terminal 102 and the generated street address. The location of the mobile terminal 102 may be determined based on, for example, user input of the location, uplink signal location operations, downlink signal location operations, GPS based operations, and/or assisted GPS operations that combine terrestrial wireless communication signals, such as cellular communication signals, and GPS signals to determine geographic position. For uplink signal based position determination, the mobile terminal 102 determines its position based on ranging measurement and triangulation of one of more wireless signals it transmits to a plurality of terrestrial receivers. The position of the mobile terminal 102 may thereby be determined by a wireless network associated with the terrestrial receivers and communicated to the mobile terminal 102. For downlink signal based position determination, the mobile terminal 102 determines its position based on ranging measurements and triangulation of wireless signals it receives from a plurality of terrestrial transmitters. The terrestrial transmitters can include cellular base stations. The uplink signal and/or downlink signal based position determination can be further based on, for example, Time of Arrival (TA) operations, Observed Time Difference of Arrival (OT-DOA), and/or Enhanced Observed Time Difference (EOTD) operations.

Accordingly, a user may optically capture a printed address and have that address used for navigation purposes by the mobile terminal 102.

Figure 2:
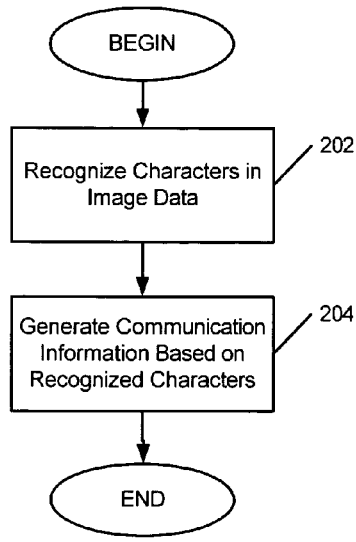
FIG. 2 is a flowchart illustrating operations for recognizing characters in image data and for generating information therefrom that is to be communicated from a mobile terminal according to some embodiments of the invention.

Referring now to FIG. 2, operations for recognizing characters in image data, and for generating information therefrom that is to be communicated from a mobile terminal, are illustrated in accordance with some more general embodiments of the present invention. At Block 202, image data is searched in an attempt to recognize characters. At Block 204, communication information is generated based on recognized characters.

Figure 3:
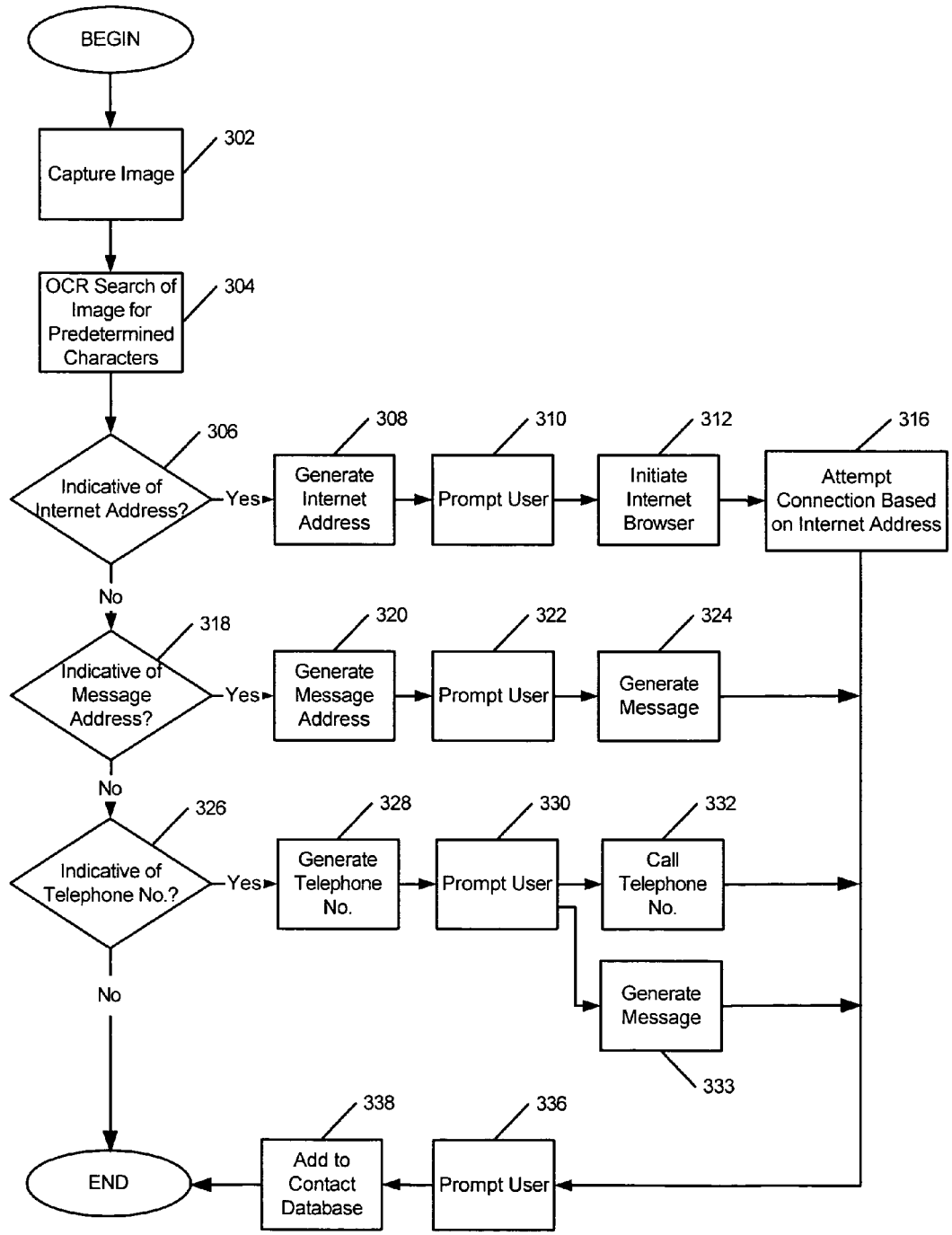
FIG. 3 is a flowchart illustrating further operations for recognizing characters in image data and for generating and communication information therefrom according to some embodiments of the invention.

Referring now to FIG. 3, further operations for recognizing characters in image data and for generating communication information therefrom are illustrated in accordance with some further embodiments of the present invention. At Block 302, image data is captured. At Block 304, the image data is OCR searched to recognize predetermined characters. At Block 306, a decision is made as to whether recognized characters are indicative of an Internet address, and, if so, an Internet address is generate at Block 308. At Block 310, a user is prompted with the generated Internet address and queried as to whether a connection should be established therewith. Based on the user's response, an Internet browser is activated, at Block 312, and an attempt is made to establish a connection based on the Internet address, at Block 316.

At Block 318, a decision is made as to whether recognized characters are indicative of a message address, and, if so, a message address is generated at Block 320. At Block 322, a user is prompted with the generated message address and queried as to whether a connection should be established therewith, and, based on the user's response, a message is generated, at Block 324.

At Block 326, a decision is made as to whether recognized characters are indicative of a telephone number, and, if so, a telephone number is generated at Block 328. At Block 330, a user is prompted with the generated telephone number and queried as to whether a telephone call should be made and/or a text message should be generated. Based on the user's response, a telephone call may be generated at Block 332 and/or a message may be generated at Block 333 using the generated telephone number.

At Block 336, a user may be prompted as to whether the generated contact information (i.e., Internet address, message address, and/or telephone number) should be stored in a contact database, and, based on the user's response, the information may be added to a contact database at Block 338. In some other embodiments the information may be added to the contact database without prompting the user. As explained above, the contact database may include a list of earlier generated information, such as a list of user selected information (e.g., frequently used information or favorites list).

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A mobile terminal comprising:
 a camera device that is configured to capture image data based on incident light;
 a controller that is configured to recognize characters in the image data, and configured to generate information that is to be communicated from the mobile terminal based on the recognized characters,
 wherein the controller is configured to respond to activation of an Internet browser by initiating searching of the image data for an indication of an Internet address and, responsive thereto, to generate an Internet address based on the recognized characters and to initiate a connection with an Internet site through a wireless transceiver based on the generated Internet address,
 wherein the controller is configured to generate a message using the generated message address for communication from the mobile terminal to a remote communication terminal having an address that corresponds to the generated message address.

2. The mobile terminal of claim 1, wherein the controller is configured to recognize the characters by carrying out an optical character recognition process on the image data.

3. The mobile terminal of claim 1, wherein the generated message comprises at least one of an email message, a Short Message Service message, an Enhanced Message Service message, and/or a Multimedia Message Service message to a remote communication terminal having an address that corresponds to the message address generated from the recognized characters.

4. The mobile terminal of claim 1, further comprising:
 a contact information database,
 wherein the controller is configured to search the image data for a predetermined Internet address dot-extension that is indicative of an Internet address and, responsive to identifying the predetermined dot-extension therein, to initiate a connection with an Internet site through the wireless transceiver based on the Internet address generated in response to characters recognized in the image data adjacent to the predetermined dot-extension, and to add the generated message address to the contact information database.

5. A mobile terminal comprising:
a camera device that is configured to capture image data based on incident light;
a controller that is configured to recognize characters in the image data, and configured to generate information that is to be communicated from the mobile terminal based on the recognized characters,
wherein the controller is configured to respond to activation of an Internet browser by initiating searching of the image data for an indication of an Internet address and, responsive thereto, to generate an Internet address based on the recognized characters and to initiate a connection with an Internet site through a wireless transceiver based on the generated Internet address,
wherein the controller is configured to determine that a plurality of the recognized characters are indicative of a telephone number in the image data, configured to generate a telephone number based on the recognized characters, and configured to generate a telephone call based on the generated telephone number.

6. A method of generating information for communication from a mobile terminal, the method comprising:
responding to activation of an Internet browser by initiating searching image data for an indication of an Internet address;
generating an Internet address based on characters recognized by said mobile terminal through the searching of the image data;
initiating a connection with an Internet site through a wireless transceiver based on the generated Internet address; and
generating by said mobile terminal at least one of an email message, a Short Message Service message, an Enhanced Message Service message, and/or a Multimedia Message Service message that is to be communicated from the mobile terminal to a remote communication terminal having an address that corresponds to the message address that was generated from the recognized characters.

7. A method of generating information for communication from a mobile terminal, the method comprising:
responding to activation of an Internet browser by initiating searching image data for an indication of an Internet address;
generating an Internet address based on characters recognized by said mobile terminal through the searching of the image data;
initiating a connection with an Internet site through a wireless transceiver based on the generated Internet address;
determining by said mobile terminal that a plurality of the recognized characters are indicative of a telephone number in the image data;
generating the telephone number based on the recognized characters; and
generating a telephone call based on the generated telephone number.

8. A method of generating information for communication from a mobile terminal, the method comprising:
responding to activation of an Internet browser by initiating searching image data for an indication of an Internet address;
generating an Internet address based on characters recognized by said mobile terminal through the searching of the image data;
initiating a connection with an Internet site through a wireless transceiver based on the generated Internet address;
determining that the recognized characters are indicative of a street address;
generating by said mobile terminal street address information based on the recognized character;
determining by said mobile terminal a location of the mobile terminal based on GPS signals; and
navigating based on the generated street address information and the determined location of the mobile terminal.

9. The method of claim 8, further comprising capturing the image data based on a user selection of at least one of a key associated with dialing a telephone number, a key associated with initiating an Internet browser, a key associated with initiating a navigation application, and a key associated with initiating messaging.

* * * * *